United States Patent [19]

Johnson

[11] 4,075,647
[45] Feb. 21, 1978

[54] EXPOSURE COUNTER AND FLASH INHIBITING MEANS FOR A PHOTOGRAPHIC APPARATUS

[75] Inventor: Bruce K. Johnson, Andover, Mass.

[73] Assignee: Polaroid Corporation, Cambridge, Mass.

[21] Appl. No.: 755,913

[22] Filed: Dec. 30, 1976

Related U.S. Application Data

[63] Continuation of Ser. No. 648,673, Jan. 13, 1976, abandoned.

[51] Int. Cl.[2] ............................................. G03B 17/36
[52] U.S. Cl. ..................................... 354/217; 354/268
[58] Field of Search ................. 354/83, 174, 217, 266, 354/268

[56] References Cited

U.S. PATENT DOCUMENTS

| 3,643,567 | 2/1972 | Douglas | 354/268 X |
| 3,984,852 | 10/1976 | Johnson et al. | 354/83 X |

*Primary Examiner*—John Gonzales
*Attorney, Agent, or Firm*—David R. Thornton

[57] ABSTRACT

An exposure counter for use in a camera which provides a user with information as to the number of unexposed film units remaining within a film cassette, positioned within the camera. The exposure counter includes an indicia-bearing member which is indexed subsequent to each exposure of a forwardmost film unit included within the film cassette. A pawl is provided for automatically unlatching the exposure counter for movement to a starting position upon removal of the film cassette from within the camera.

The camera includes an exposure actuator for actuating an electronic exposure control system included therein whereby the forwardmost film unit is exposed, processed and advanced to the exterior of the camera.

The exposure counter is mounted such that the position of the exposure actuator is responsive to the angular disposition of the indicia-bearing member of the exposure counter. Therefore, the exposure counter communicates motion to the exposure actuator which in turn assumes a definite series of positions when the exposure counter assumes a corresponding series of angular dispositions. In one of the positions assumed by the exposure actuator, a dark slide cover is automatically removed and advanced to the exterior of the camera when a new cassette is loaded into the camera and its loading door secured, and in another one of the positions the exposure actuator is inhibited from further actuation thereby providing a mechanical exposure and flash inhibit for the camera.

17 Claims, 13 Drawing Figures

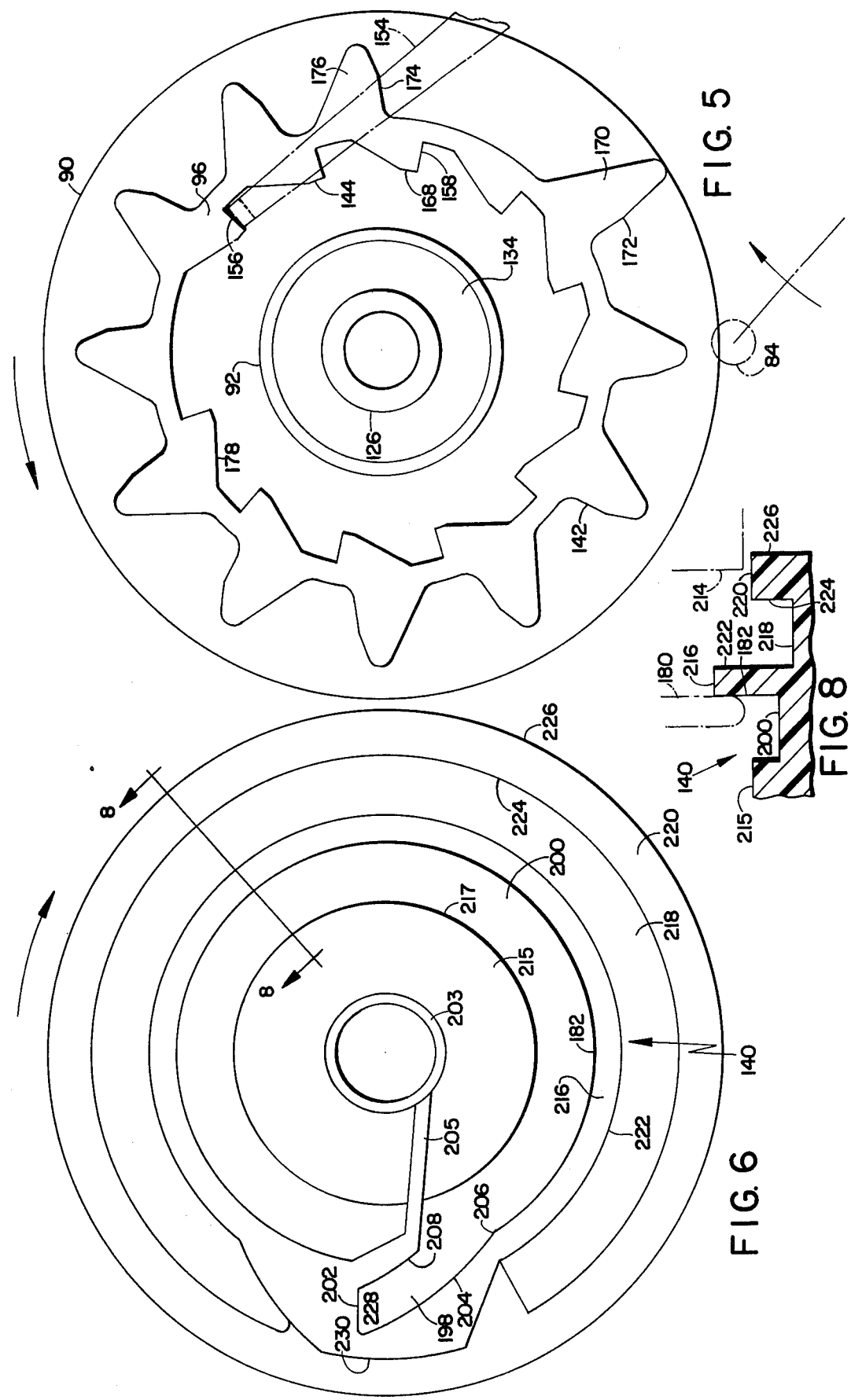

EXPOSURE COUNTER AND FLASH INHIBITING MEANS FOR A PHOTOGRAPHIC APPARATUS

This is a continuation of application Ser. No. 648,673, filed Jan. 13, 1976, now abandoned.

BACKGROUND OF THE INVENTION

1. Field of the Invention

This invention relates to the field of photography and, more particularly, to a photographic apparatus including an exposure counter which communicates motion to an exposure actuating means whereby the exposure actuating means assumes a definite series of positions.

2. DESCRIPTION OF THE PRIOR ART

It is customary to provide photographic apparatus with an exposure counter so as to convey certain information to the user regarding the number of exposures which have been made or which remain in a film assemblage located within the photographic apparatus. Exposure counters generally include an indicia-bearing member having characters thereon which are sequentially presented at a viewing station, usually a window, in the apparatus for conveying this information to the user. The characters may be sequentially changed by an indexing system coupled to a film advancing apparatus which in turn is manually operated by a hand crank located on the camera as shown in U.S. Pat. Nos. 2,608,922 and 2,552,275. Operation of the hand crank advances a film frame into position for exposure and simultaneously indexes the exposure counter to change the character present at the viewing station. Needless to say, manual operation of the crank leaves something to be desired. Furthermore, exposure counters are unduly complicated in construction and operation, and are often positioned in locations within the apparatus having limited accessibility, thereby making it more difficult to reset them to their starting position subsequent to the exposure of the last film unit or frame in the film assemblage. One solution proposed to improve the problem of resetting the exposure counter is described in U.S. Pat. No. 2,813,469, namely, an arrangement whereby opening the camera's door will automatically reset the camera's exposure counter to its starting position. However, opening the camera's door is not necessarily connected with the act of providing the camera with a fresh supply of film and therefore does not necessarily ensure that the counter will be properly oriented prior to the next exposure. For example, after one or more film units have been exposed, should the camera's door be opened for purposes of viewing the film container to ascertain if it is correctly positioned within the camera or for inspection of one of the components of the camera, such as the processing rollers in a camera of the self-developing type, the counter would be automatically reset thereby resulting in the exposure number of the counter being out of phase with the number of the next exposure.

U.S. Pat. No. 3,653,313 describes an exposure counter for use with a single-lens reflex camera which solves the problem of resetting exposure counter by automatically resetting the camera's counter upon removal of a flim container from within the camera. However, the exposure counter is coupled to a reflecting member or mirror and is sequentially advanced in response to movement of the reflecting member between a raised exposure position and a lowered viewing position. In order to utilize the pivotal movement of the reflecting member to index or rotate the exposure counter, a relatively complex system including a plurality of pivotally mounted pawls and cam surfaces interact to accomplish the desired result of indexing the exposure counter. Therefore, the indexing and resetting of the exposure counter is substantially dependent upon each member of the system being properly located and coupled to an adjoining member such that the previous movement of one member is sufficient to displace a second member in contact therewith, originating with the reflecting member operating to initiate movement of the counter in the indexing mode and terminating with a cantilevered spring, one end of which displaces one of the pawls during removal of a film container thereby enabling the exposure counter to reset itself in the starting position.

An improved exposure counter employing relatively few moving parts is described in detail in a copending application Ser. No. 554,764, filed on Mar. 3, 1975 in the name of Bruce K. Johnson et al, entitled "Exposure Counter for an Automatic Camera", now Pat. No. 3,984,852. The exposure counter disclosed therein includes a rotatably mounted, indicia-bearing cylinder having characters arranged around an outer periphery thereof which is sequentially advanced during each photographic cycle of an automatic camera so as to convey information to the user regarding the number of exposures which have been made or which remain in a film cassette stored within the camera. The cylinder is sequentially advanced or indexed by a pin extending from one side of a gear which rotates one revolution during each photographic cycle of the camera. During each revolution of the gear, the pin engages one of a plurality of teeth supported upon a first side of the cylinder thereby advancing the cylinder and changing the character presented to the user. The exposure counter is further provided with a pawl which prevents movement of the cylinder in a predetermined opposing direction to the advancement of the cylinder by ratcheting into engagement with one of a plurality of notches arranged upon a second side of the cylinder subsequent to the advancement of the cylinder. Upon the removal of a spent film container or cassette from within the camera, the pawl moves out of engagement with the cylinder thereby allowing the latter to automatically reset itself to a starting position.

However, the aforementioned exposure counters have been limited to conveying information to the user as to the number of exposures which have been made or which are available for use in the camera. Previously, the starting and end positions have only conveyed to the user that the film chamber was full or empty. The motion of the counter therebetween during the sequential advancement or the resetting thereof has not generally been utilized to provide the camera with any additional operational advantages or desirable and serviceable features. Therefore, the inclusion or exclusion of an exposure counter within a camera has often been determined by weighing the advantage of providing such information on the camera against the degree of mechanical difficulty and cost of including such a convenience within a limited area of a compact housing of the camera, particularly in the design of a low-cost, lightweight automatic photographic apparatus.

SUMMARY OF THE INVENTION

The present invention relates to a photographic apparatus, preferably in the form of a camera, for exposing and processing self-developing type film units. The apparatus features a low-cost, efficient, and relatively easy to manufacture exposure counter including an indicia-bearing member for presenting characters at a viewing station on the apparatus defining the status of the number of exposures which have been made or the number of exposures remaining within the apparatus.

In a preferred embodiment, the exposure counter is incorporated into a simple and low-cost version of an automatic self-developing type camera including an exposure actuator means which is adapted to be manually depressed by the user to activate a complete photographic cycle of operation whereby a film unit is exposed, processed and delivered to the exterior of the camera. The camera further includes a wheel or relatively large diameter timing gear and a motor for driving the timing gear of single revolution during the course of a cycle of camera operation. The timing gear includes a pin thereon which engages the indicia-bearing member during the cycle when moved through a predetermined arc defining an indexing segment and is disengaged therefrom at the end of the indexing segment whereby a new character is presented at the viewing station.

The exposure counter is mounted such that the position of the exposure actuator means is responsive to the angular disposition of the indicia-bearing member of the exposure counter. This is to say, the exposure counter communicates motion to the exposure actuator means and the exposure actuator means assumes a definite series of positions when the exposure counter assumes a corresponding series of positions.

The camera includes a housing section having a receiving chamber wherein a film cassette including an assemblage having a predetermined number of film units and a dark slide cover in superposition thereto is received for sequential presentation to a flim exposure system within the camera. The exposure counter is stationed in a starting position when the film cassette is inserted into the receiving chamber. The exposure actuating means is held in a forwardmost position within the housing section when the exposure counter is in the starting position whereby the dark slide will be automatically removed during a pre-exposure cycle of operation from within the film cassette and advanced to the exterior of the camera once the film cassette has been properly positioned and secured, i.e., the loading door closed, within the receiving chamber. During this pre-exposure cycle, the indicia-bearing member is indexed by the timing gear to present a new character at the viewing station and the exposure actuator means assumes a second intermediate position wherein it is adapted to be manually activated by the user for exposing each successive film unit. When the supply of the predetermined number of film units is exhausted, the exposure counter arrives at a terminal or end position and in response thereto, a means for inhibiting actuation of the exposure actuator means is moved into engagement therewith to prevent further actuation of the exposure actuator means thereby providing a mechanical flash inhibit when the exposure counter indicates that the film cassette is empty and a source of artificial illumination, e.g., a flash array, is connected to the camera.

During each actuation of the exposure actuator means the indicia-bearing member is indexed into a new position wherein a new character, descending by one digit, is presented at the viewing station. A spring coupled thereto is wound during each indexing segment. A pivotally mounted pawl functions as a latching device to engage the indicia-bearing member and thereby prevent reverse rotation of the indicia-bearing member under the bias of the energy stored during the winding of the spring. When the film cassette is removed from within the receiving chamber, the pawl pivotally moves out of engagement with the indicia-bearng member thereby allowing the spring to return the exposure counter to the starting position.

In an alternative embodiment, when the supply of the predetermined number of film units is exhausted and the exposure counter is indexed into the terminal or end position, a means for contact with the exposure actuator means mounted adjacent the indicia-bearing member is moved into the path of travel of the exposure actuator means to prevent further actuation of the exposure actuator means thereby providing the mechanical flash and exposure inhibit for the camera when the exposure indicates the film cassette is empty.

One object of the invention is to provide a camera with means to mechanically prevent the initiation of another exposure cycle when the supply of non-exposed film units within the camera has been exhausted.

Another object of the invention is to provide an apparatus of the type set forth above which includes an exposure counter and an exposure actuator means whose position is responsive to the angular disposition of the exposure counter.

A further object of the invention is to provide a camera for exposing self-developing type film units including means for initiating an exposure cycle for each of the film units, mounted for movement between a first forwardmost position wherein it cannot be actuated to initiate an exposure cycle, to a second intermediate position wherein it may generally be actuated to initiate an exposure cycle and a third rear position wherein an exposure cycle is initiated having means coupled therewith for moving the initiating means from the first position into the second position when the film units have been properly positioned and secured within the camera.

Other objects of the invention will in part be obvious and will in part appear hereinafter.

The invention accordingly comprises the apparatus possessing the construction, combination of elements and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in connection with the accompanying drawings wherein:

FIG. 5 is an enlarged side view of one of the components of the exposure counter of FIG. 3;

FIG. 6 is an enlarged side view of the component of FIG. 5 as viewed from an opposite side;

FIG. 8 is a partial section view taken along the line 8—8 of FIG. 6;

DETAILED DESCRIPTION OF THE INVENTION

Figure 1:
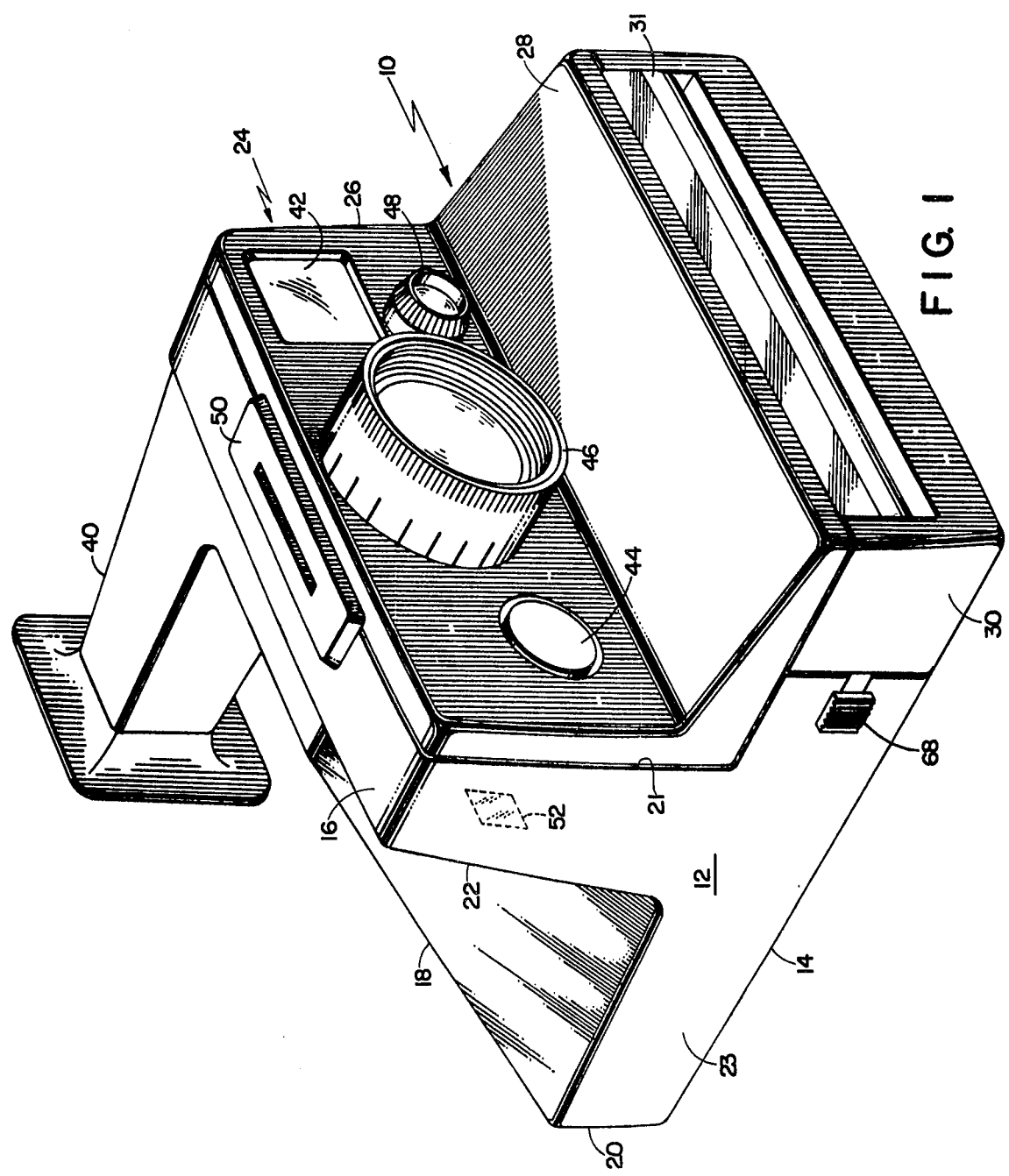
FIG. 1 is a perspective view of a photographic apparatus for exposing and processing self-developing type film units.
Figure 2:
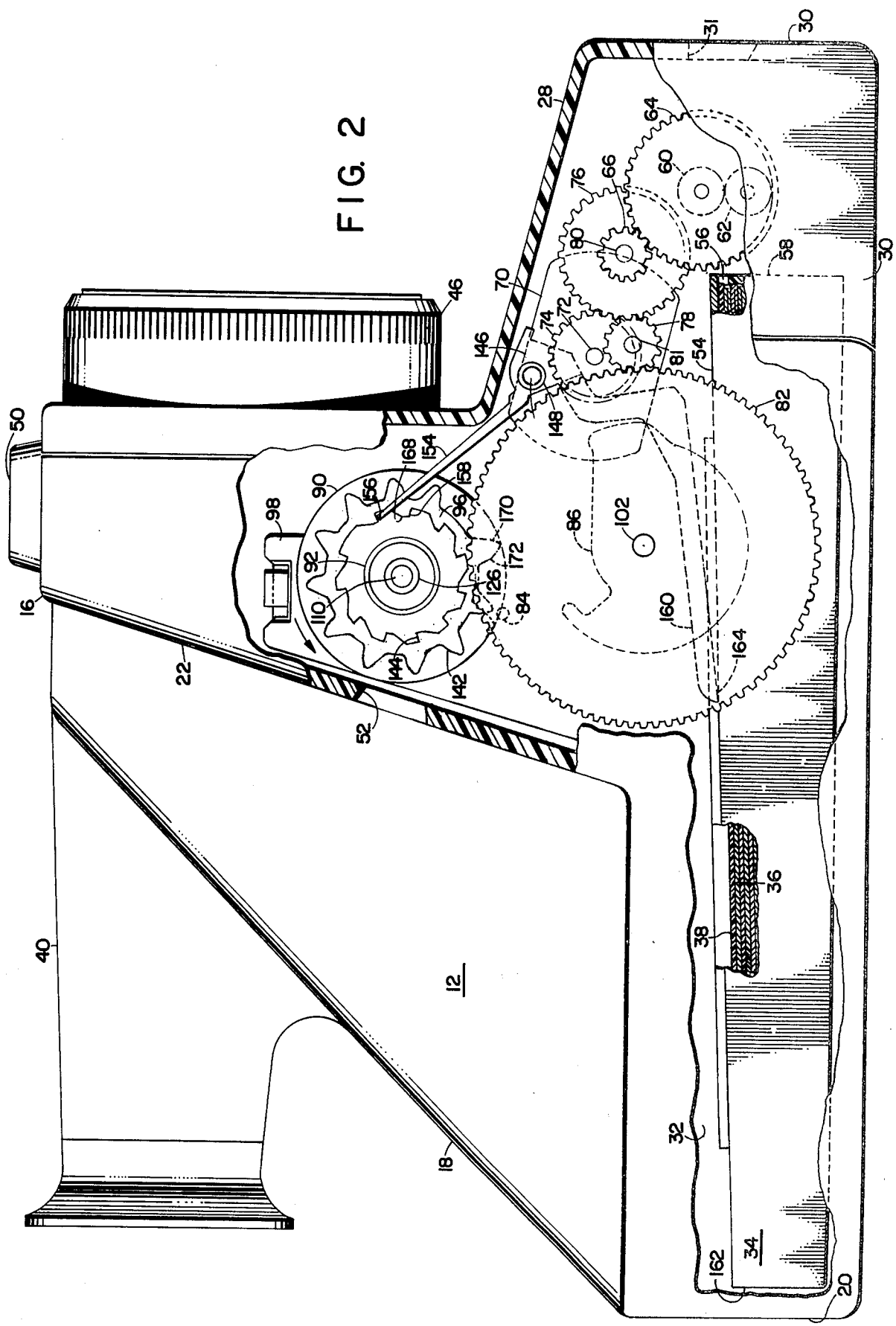
FIG. 2 is a side elevational view, partly in section, of the photographic apparatus of FIG. 1 having a film cassette secured therein.
Figure 4:
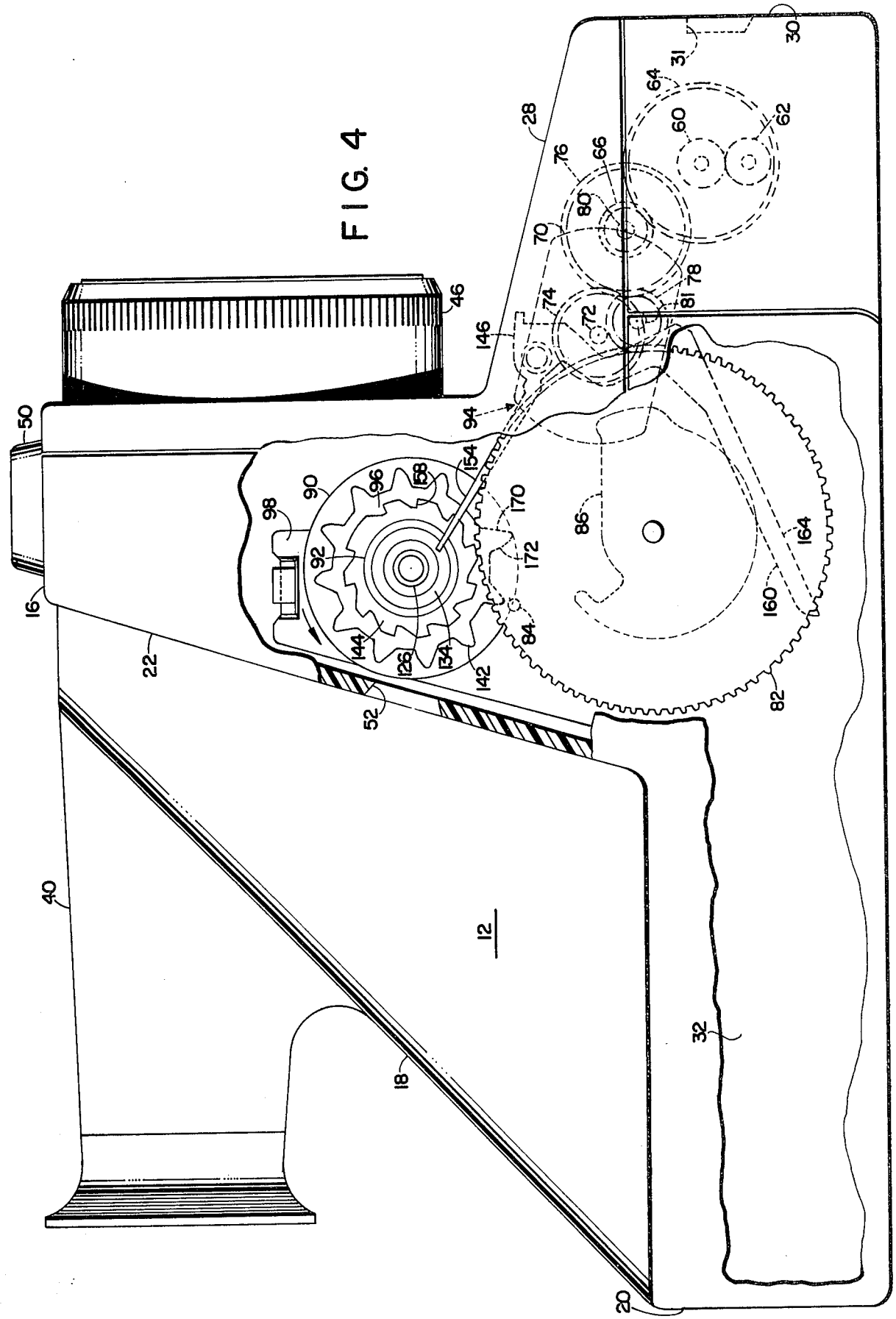
FIG. 4 is a side elevational view, partly in section, of the photographic apparatus of FIG. 2 having the film cassette removed.

Referring in more detail by reference characters, FIGS. 1, 2 and 4 show a camera 10 for exposing and processing self-developing type film units. Camera 10 includes a housing section 12 defined by a substantially planar bottom wall 14, a top wall 16, an inclined rear wall 18, a trailing end wall 20, a leading end wall 21, an inclined surface 22 intermediate the trailing and leading end walls 20 and 21, respectively, and a pair of side walls 23. Housing section 12 is coupled to a front cover 24 including a vertical upper section 26 integrally joined to an inclined lower section 28 to form a leading end wall for the camera 10. A film loading access door 30 including a film withdrawal slot 31 transversely disposed therein is pivotally mounted for movement between positions blocking and unblocking an open end of a chamber 32 included within the housing section 12 for receiving and supporting a film cassette or container 34. The cassette 34 (see FIG. 2) encloses an assemblage including a plurality of film units 36 and a dark slide 38 in superposition thereto for preventing exposure of a forwardmost film unit prior to insertion of the film cassette 34 into the chamber 32.

The housing section 12 may include an integrally molded viewfinder housing 40 extending rearwardly from the leading wall 21 of the housing section 12. The viewfinder housing 40 affords protection to internal components positioned therein and enables a user to view and frame a desired subject or scene through a window 42 included within the vertical upper section 26 of the front cover 24.

The vertical upright section 26 further provides a mounting surface for a manually activated exposure actuator button 44, an objective lens assembly 46 and a photocell aperture 48. The top wall section 16 includes a mounting receptacle 50 for a flash attachment device for illuminating low light level scenes.

The intermediate inclined surface 22 includes a window or viewing station 52 therein whereat a visual indication of the number of exposures made or the number of unexposed film units 36 remaining in the film cassette 34 is presented.

The film units 36 are multilayer structures including one or more photosensitive image-receiving layers arranged in superposition relation and a rupturable pod (not shown) containing a supply of fluid processing composition attached to a leading end of the film unit 36. The film cassette 34 including the assemblage is similar to that disclosed and defined in U.S. Pat. No. 3,874,875 issued to E. H. Land on Apr. 1, 1975. The film units 36 included in the assemblage represent a general class of "integral type" self-developing type film units similar to that described in U.S. Pat. No. 3,415,644 issued to E. H. Land on Dec. 10, 1968. The film cassette 34 is shown in position within the film receiving chamber 32 of the camera 10 in FIG. 2. The cassette 34 has a general tapered rectangular shape having a forward wall 54 including an exposure aperture (not shown) therein which is generally co-extensive with the photosensitive area of the underlying film unit 36 contained in the cassette 34. Once the cassette 34 has been properly positioned within the film receiving chamber 32, the dark slide cover 38 must be removed prior to commencing a first photographic cycle whereupon the forwardmost film unit 36, subsequent to exposure, is advanced through an elongated film exit slot 56 disposed transversely within a leading end wall 58 of the film cassette 34. As the foremost member advances through the exit slot 56, it enters into the bite of a pair of juxtaposed pressure-applying members or rollers 60 and 62 mounted adjacent the film withdrawal slot 31. An opaque shade (not shown) is mounted adjacent the film withdrawal slot 31 in position to be engaged by a leading edge of the foremost member as it passes through the film withdrawal slot 31 to the exterior of the camera 10 for preventing further exposure of untreated portions of the film unit by ambient light as disclosed in a copending application Ser. No. 466,371, filed on May 2, 1974 in the name of Andrew S. Ivester entitled "Opaque Shade", now Pat. No. 3,940,774.

The film loading access door 30 is pivotally connected to housing section 12 in such a manner so as to allow the access door 30 and the rollers 60 and 62 to be pivoted downwardly to provide access to the film receiving chamber 32 for loading and unloading the film cassette 34. A detailed description of the manner in which the film loading access door 30 rollers 60 and 62 are coupled to the remainder of the camera 10 may be found in a copending application Ser. No. 582,720, filed on June 2, 1975 in the name of Andrew S. Ivester entitled "A Mounting Apparatus for a Spreader Roller Assembly", now Pat. No. 3,974,510. The rollers 60 and 62 are suitably mounted within the access door 30 by a mounting bracket (not shown). When the access door is pivoted up to its operative, closed position, a roller gear 64 is aligned and meshes with a roller drive gear 66.

The loading access door 30 is released by a manually released latch release button 68 (see FIG. 1). In response to the closure of the loading access door 30 to secure the film cassette 34 within the receiving chamber 32, an electrical switch is closed causing a photographic electronic control system in the camera 10 to operate automatically in a pre-exposure mode whereby the dark slide cover 38 covering the exposure area of the forwardmost film unit 36 in the film cassette 34 or a forwardmost member of the assemblage is engaged by a film advancing apparatus (not shown) and advanced from within the film cassette 34 through the elongated film exit slot 56, between rollers 60 and 62, and through the film withdrawal slot 31 to the exterior of the camera 10. The electrical switch is coupled to the leading access door 30 such that the electronic control system is rendered inoperative if the loading access door 30 is not pivotally moved into the closed position in a manner which shall be described in detail hereinafter.

As previously stated, camera 10 includes film exposure means comprising the objective lens assembly 46 mounted in the vertical upper section 26 of the front cover 24 and a shutter mechanism (not shown) mounted behind the lens assembly 46 for regulating the transmission of image-bearing light into the camera 10. The light rays passing through the lens assembly 46, impinge upon a mirror (not shown) mounted at an appropriate angle upon the interior surface of the inclined rear wall 18 of the housing section 12, and are then directed downwardly through the exposure aperture of the film cassette 34 to expose a forwardmost film unit.

To initiate exposure of the forwardmost film unit 36 subsequent to the automatic removal of the dark slide cover 38, the electronic control system must be manually activated whereupon an exposure control circuit operates to control the shutter and a sequencing control system operates to initiate and control an orderly performance of functions during a photographic exposure cycle wherein the film unit 36 is exposed and processed. A complete description of the operation of the electronic control system and the various subsystems included therein is presented in copending applications Ser. No. 554,777 filed on Mar. 3, 1975 in the name of David E. Van Allen et al., entitled "Photographic Apparatus with Sequencing System" and Ser. No. 554,778 filed on Mar. 3,1975 by Bruce K. Johnson et al., entitled "Modular Constructed Sequencing System for Photographic Apparatus", now Pat. No. 3,967,304.

The foregoing is a general description of the camera 10 and serves to provide background information for the following detailed disclosure of an exposure counter which in addition to presenting a character at the viewing station 52 representing the number of exposures which have been made or the number of exposures remaining within the camera 10 cooperates, when in a starting position, with the electronic control system to automatically advance the dark slide cover 38 from within the film cassette 34 to the exterior of the camera 10 upon the closure of the access door 30. When the exposure counter is sequentially indexed into a terminal position, it further provides a mechanical interlock which inhibits the firing of the flash system of the camera by inhibiting the movement of the exposure actuator button 44.

The camera 10 is also provided with a motor driven gear train shown in FIGS. 2 and 4. The gear train is driven by an electrically energized motor 70 which may be energized by an electrical battery (not shown) preferably included within the film cassette 34, as disclosed in U.S. Pat. No. 3,543,662 issued to Irving Erlichman on Dec. 1, 1970, or from a separate battery source mounted within the camera.

The gear train comprises the roller drive gear 66, an intermediate drive gear 74, and first and second gears 76 and 78, respectively.

The motor 70 includes a motor drive shaft 72 extending from one end thereof for supporting the roller drive gear 66 and a first gear 74 press fitted thereon. When the loading access door 30 is pivotally moved upwardly and latched into its closed operative position, the roller gear 64 is aligned and in enmeshment with the roller drive gear 66 whereby the top roller 60 is rotatably driven in a direction to cause the film unit 36 to be advanced between the rollers.

Intermediate drive gear 74 is in enmeshment with the first gear 76 and is adapted to drive the first gear 76 and the roller drive gear 66 coaxially dis-disposed upon a shaft 80 for coaxial rotation. The second gear 78 is rotatably supported upon a second shaft 81 for coupling the first gear 76 with a large diameter timing gear or wheel 82 whereby the timing gear 82 is rotatably driven by the motor 70

The timing gear 82 includes a drive pin 84 and a film advance profile cam 86 upon an interior surface thereof as shown in FIGS. 2 and 4. The cam 86 is included thereon for engagement with a cam follower included upon a reciprocating film advance member (not shown) which engages and follows the periphery portions of the cam 86 whereby the film advancing member is moved, from the rear of the housing section 12 forward in the direction of the film withdrawal slot 31 longitudinally within the film receiving chamber 32 of the housing section 12 for advancing the forwardmost film unit in the film cassette 34, subsequent to exposure from the exposure position, through the film exit slot 56 and into the bite of rollers 60 and 62 for processing. A full description of the operation of the film advancing member may be found in the aforementioned copending application Ser. No. 554,777.

Figure 3:
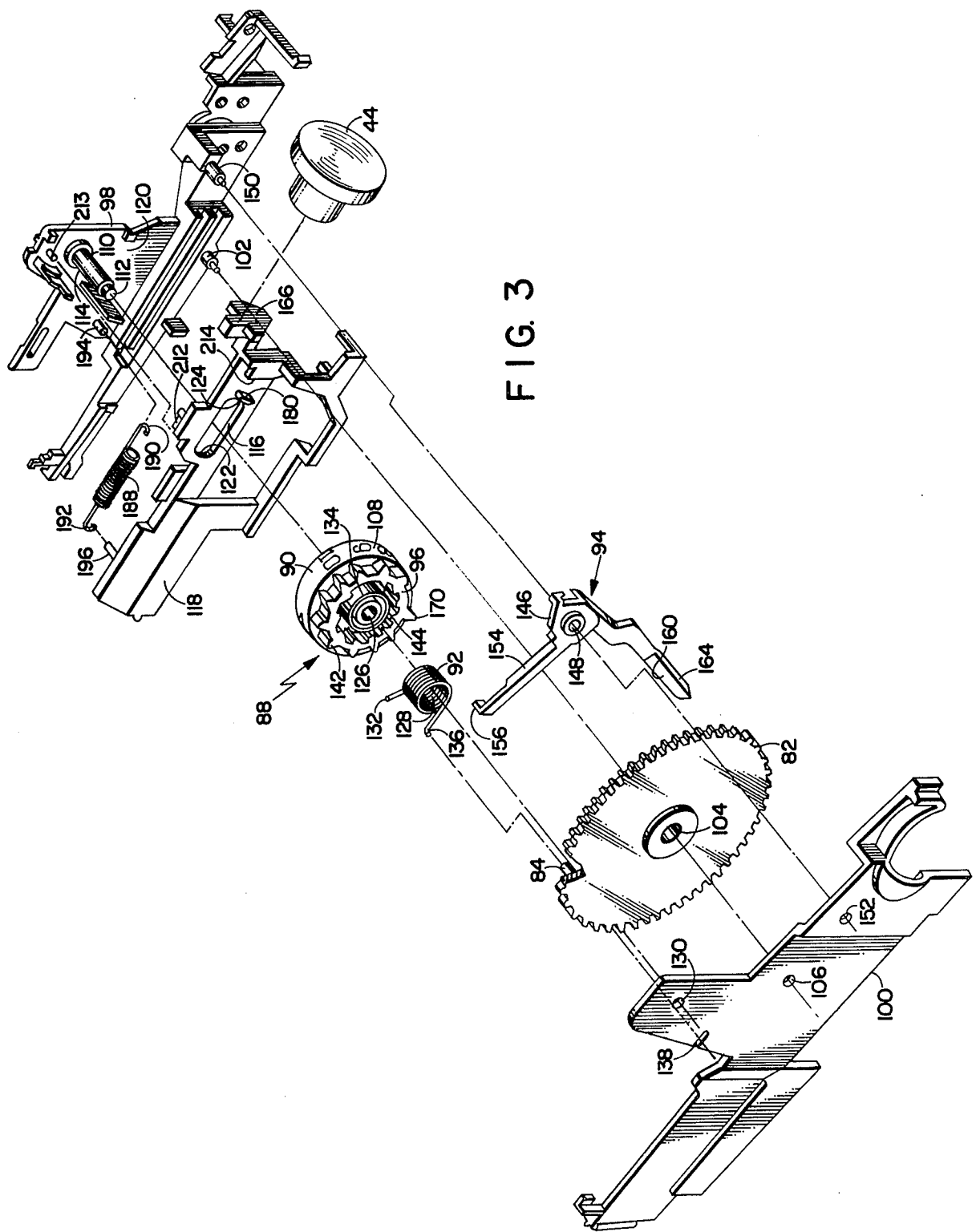
FIG. 3 is a perspective view, shown in exploded fashion, of a preferred embodiment of an exposure counter included within the photographic apparatus of FIG. 1 and its related structure.

An exposure counter 88 including an indicia-bearing member 90, spring means 92, responsive means or pawl 94, and a ratchet wheel 96 is shown in exploded fashion in FIG. 3. The exposure counter 88 is mounted between a pair of spaced first and second side mounting members 98 and 100, respectively. After the various components of the exposure counter 88 have been suitably mounted in operative relationship to each other, the first and second side members 98 and 100 may be joined together thereby locking the assembled components of the exposure counter 88 in position.

First side mounting member 98 includes an inwardly extending integrally molded shaft 102 for rotatably mounting the timing gear 82 thereon. The shaft 102 extends through a center bore 104 of the timing gear 82 and its end press-fitted into a receiving aperture 106 in the second side member 100.

The indicia-bearing member 90 includes a rotary dial 108 supporting identifying characters around a face thereof for visually indicating through a window of the viewing station 52 the number of film units 36 included within the camera 10. The exposure counter 88 is stationed in a starting position when a fresh film laden cassette 34 is inserted into the receiving chamber 32. Once the dark slide cover 38 has been removed and passed through the film withdrawal slot 31 of the loading access door 30, the indicia-bearing member 90 is indexed by the timing gear 82 and a character designating the number of the forwardmost film unit 36 to be exposed, or put another way, the number of film units remaining in the film cassette 34, is presented at the window of the viewing station 52. As each exposure of the underlying film unit is made, the indicia-bearing member 90 is sequentially indexed in a counterclockwise direction and the character or numeral indicating the number of remaining film units is changed and descends one digit per exposure cycle until the indicia-bearing member 90 is moved into a final position wherein it indicates that the film cassette 34 is empty.

The indicia-bearing member 90 is rotatably mounted upon an integrally formed second shaft 110 extending inwardly from the first side mounting member 98. The second shaft 110 includes a small diameter, cylindrical first portion 112 joined to a relatively large diameter cylindrical second portion 114 integrally joined to a surface of the first side mounting member 98. The second shaft 110 extends through a slot 116 of a slider member 118 whereby the slider member 118 may be moved longitudinally within the housing section 12 and parallel with the inwardly facing surface 120 of the first side mounting member 98 upon the second portion 114 of the shaft 110 between the limits defined by a semi-circular edge 122 and a vertical edge 124 of the slot 116.

The second cylindrical portion 114 of the second shaft 110 also extends through a central bore 126 of the indicia-bearing member 90, through a center portion 128 of the spring means 92, and is press-fitted into an aperture 130 on the second mounting member 100. The spring means 92 is a helically formed biasing spring having a first end 132 suitably seated and secured to a hub portion 134 of the indicia-bearing member 90 and a second end 136 positioned and secured within a slot 138 provided therefor on the second side mounting member 100.

The indicia-bearing member 90 of the exposure counter 88 includes a face-groove cam 140 (shown in FIGS. 6, 7a, 7b and 7c) on a first side thereof and the ratchet wheel 96 upon a second side thereof. The indicia-bearing member 90 is adapted to be sequentially indexed one position in response to each camera operational cycle. The large diameter timing gear 82 completes one revolution during each cycle of the camera operation and performs the indexing function by driving the indicia-bearing member 90 in a counterclockwise direction as viewed in FIGS. 2, 4 and 5. The drive pin 84 included on the inwardly facing surface of the timing gear 82 is positioned to engage the ratchet wheel 96 included upon the second side of the indicia-bearing member 90.

The ratchet wheel 96 includes a first set of drive teeth 142 spaced around an outer periphery of the ratchet wheel 96 arranged such that the drive pin 84 engages a particular tooth and rotates the indicia-bearing member 90 through a predetermined arc defining an indexing segment before the drive pin 84 moves out of engagement therewith at the end of the predetermined arc. A second set of latching teeth 144 are spaced around an inner radius of the ratchet wheel 96 for engagement with the responsive means or pawl 94 which operates to capture the indicia-bearing member 90 after its rotation through the predetermined arc. It will be noted that the spring means 92 is being wound and thereby storing potential energy during each rotation of the indicia-bearing member 90. The function of the responsive means or pawl 94 is to prevent reverse rotation of the indicia-bearing member 90 under the biasing of the spring means 92 after the drive pin 84 on the timing gear 82 has moved out of engagement with one of the drive teeth 142 of the ratchet wheel 96.

The responsive means 94 is preferably integrally molded including a support housing 146 having a bore 148 therein. An integrally molded shaft 150, extending inwardly from the inwardly facing surface 120 of the first side mounting member 98, extends through the bore 148 and is press-fitted into a suitable receiving hole 152 included in the second side mounting member 100 whereby the responsive means 94 is mounted for pivotal movement thereon between a first position (as viewed in FIG. 4), wherein the responsive means 94 is disengaged from the second set of latching teeth 144 of the ratchet wheel 96, and a second position wherein the responsive means 94 is engaged with the second set of latching teeth 144 (as viewed in FIG. 2). The responsive means 94 includes a pawl arm 154 extending from the support housing 146 having a latching edge 156 formed thereon for substantial complete engagement with an underlying surface 158 of a particular latching tooth 144 of the ratchet wheel 96 when the responsive means 94 is in the second position thereby preventing the reverse rotation of the indicia-bearing member 90 after the drive pin 84 is moved out of engagement with one of the drive teeth 142.

Extending from the support housing 146 of the responsive means 94, is a second depending arm 160 angularly displaced from the pawl arm 154 such that contact with a leading edge 164 of the depending arm 160 causes the pawl arm 154 to be biased upwardly (as viewed in FIG. 2) whereby the latching edge 156 is substantially engaged along the underlying surface 158 of one of the latching teeth 144. As long as the pawl arm 154 remains biased upwardly, the indicia-bearing member 90 is substantially prevented from moving in a direction against the latching edge 156 of the pawl arm 154 and is thereby limited to undirectional rotation, i.e., in a direction in which the leading edge 158 of the latching teeth 144 is rotated away from the latching edge 156 of the pawl arm 154 (counterclockwise as viewed in FIG. 2).

The camera 10 is shown in FIG. 4 having an empty film receiving chamber 32 prior to the insertion of the film cassette 34 therein. It will be noted that the responsive means 94 is in the first position wherein the latching edge 156 of the pawl arm 154 is out of engagement with the ratchet wheel 96 and the depending arm 160 of the responsive means 94 is lowered to extend into the receiving chamber 32 within the path of travel of an entering fresh, film laden cassette. When the loading access door 30 is pivotally moved downwardly into the unblocking position, an open end of the receiving chamber 32 is exposed to receive the fresh film cassette therein. Upon slidably inserting the fresh film cassette into the receiving chamber 32, a leading end wall 162 acting as an advancing edge of the film cassette 34 strikes against the forward edge 164 of the depending arm 160 and pivotally rotates the responsive means 94 clockwise (as viewed in FIG. 2) into the second position. The pawl arm 154 is upwardly biased by the leading end wall 162 into engagement with the ratchet wheel 96 as a result of the pivotal movement of the responsive means 94 and the latching edge 156 is moved into position beneath the underlying edge 158 of one of the latching teeth 144. The forward edge 164 of the depending arm 160 slides upon a gradual sloping surface of the forward wall 154 of the film cassette 34 during the continued insertion thereof until the film cassette 34 arrives at a terminal position within the film receiving chamber 32 whereupon the latching edge 156 is in substantially full engagement with the underlying surface 158 of an appropriate one of the latching teeth 144. The responsive means 94 is supportably retained in the second position by the sloping surface of the forward wall 54 of the film cassette 34 until the cassette 34 is removed from within the film receiving chamber 32. The responsive means 94 is retained in the second position by the sloping surface of the forward wall 54 of the film cassette 34 bearing against the forward edge 164 of the depending arm 160 during which the indicia-bearing member 90 is permitted to be rotated or indexed unidirectionally, i.e., counterclockwise as viewed in FIGS. 2 and 4. When the film cassette 34 is removed from within the receiving chamber 32, the support housing 146 of the responsive means 94 is permitted to pivotally move, under the influence of a spring (not shown) about the shaft 150 in a counterclockwise direction (as viewed in FIGS. 2 and 4) thereby allowing pawl arm 154 to drop out of engagement with the ratchet wheel 96 and the responsive means 94 to move back into the first position.

The exposure counter 88 is considered to be in a starting position when the film receiving chamber 32 is empty and just after inserting a new cassette into the chamber. Prior to the insertion of the film cassette 34 into the film receiving chamber 32, the various components of the exposure counter 88 assume the positions shown in FIGS. 4 and 5. It will be noted the responsive means 94 is shown in FIG. 4 in the first position wherein the pawl arm 154, due to the absence of the film cassette 34, is disengaged from the ratchet wheel 96 and the indicia-bearing member 90, under the bias of the spring means 92 has been rotated to a position whereat indicia indicating that the film receiving chamber is empty, is presented at the window of the viewing station 52.

When the exposure counter 88 is in the starting position, the camera's electronic control system is prepared to operate in the pre-exposure mode for automatic advancement of the dark slide cover 38 to the exterior of the camera upon pivotal movement of the access door 30 to the closed position, as previously described. In the preferred embodiment, insertion of the film cassette 34 into the film receiving chamber 32 provides the electronic control system with a fresh battery for operation thereof. The pivotal movement of the loading access door 30 to the closed position secures the film receiving chamber 32 and closes the electrical switch with the exposure counter 88 stationed into the starting position, and as will be described hereinafter, signals the electronic control system that a fresh film cassette has been received and secured within the film receiving chamber 32. This signal activates the electronic control system and thereby the sequencing control system to operate and control an orderly performance of functions, described in detail in the aforementioned copending application, Ser. No. 554,777, whereby the forwardmost member of the assemblage, usually the dark slide cover 38, is advanced from within the film cassette 34 to the exterior of the camera 10.

Figure 7A:
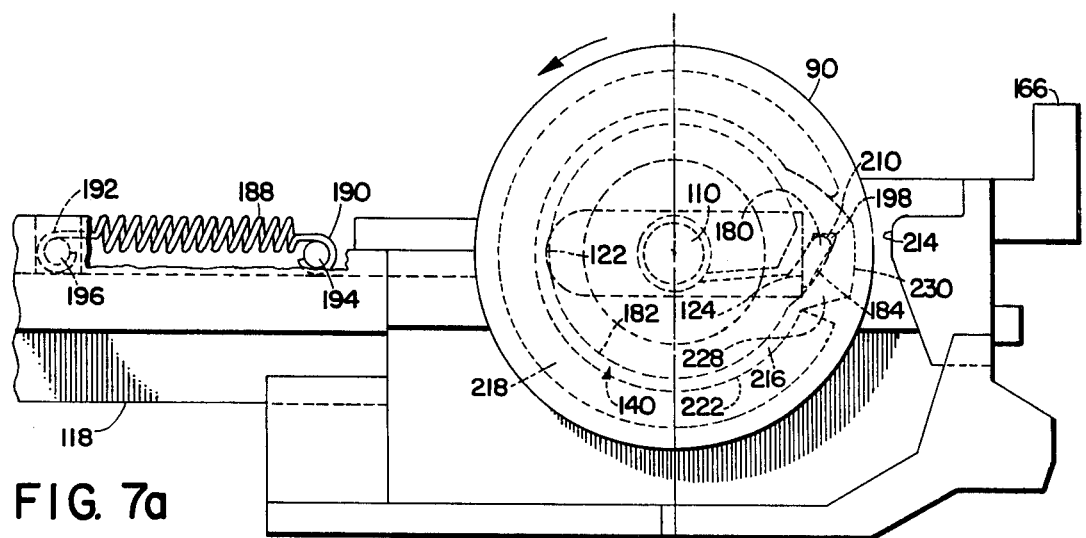
FIGS. 7a, 7b and 7c are diagrammatic illustrations of the operative positions of the exposure counter.
Figure 7B:
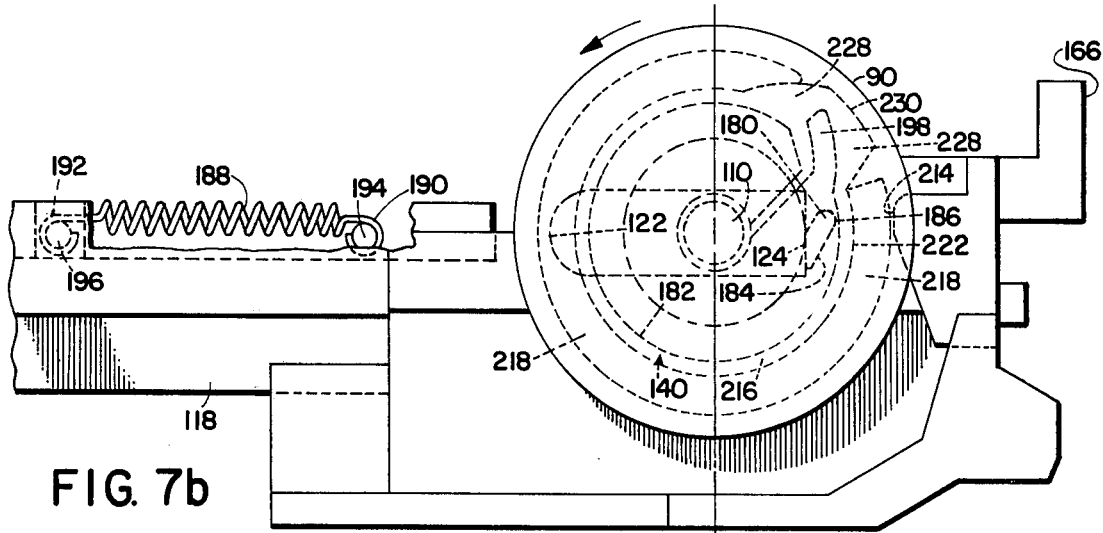

The user may now depress the exposure actuator button 44 attached to a mounting surface 166 provided therefor upon the slider member 118 to initiate exposure of the forwardmost film unit 36. The slider member 118 is a manually actuated, forwardly biased, three position means for initiating the exposure of each of the predetermined number of film units 36 included within the assemblage stored in the film cassette 34. The slider member 118 slidably moves upon the second shaft 110 longitudinally within the housing section 12 between a first forwardmost position wherein it cannot be actuated to initiate an exposure cycle, as shown in FIG. 7a, to a second intermediate wherein it may be actuated to initiate an exposure cycle, as shown in FIG. 7b, to a third exposure initiating position (not shown) upon manual depression of the exposure actuator button 44 to activate the electronic control system whereby the film units 36 are exposed, processed and advanced to the exterior of the camera 10.

Activation of the electronic control circuit by depressing the exposure actuator button 44 starts an exposure cycle wherein the film exposure means including the objective lens assembly 46 cooperates with the shutter assembly and the mirror to define a folded optical path through which radiation received through the objective lens assembly 46 is directed to a photosensitive surface of the forwardmost film unit 36 within the film cassette 34. Subsequent to the exposure, the motor 70 is set into motion whereupon the timing gear 82 is rotated one revolution by the motor 70 during which time the drive pin 84 functions as a means for indexing the indicia-bearing member 90 and the film advancing profile cam 86 included upon the timing gear 82 moves the reciprocating film advance member (not shown) longitudinally within the housing section 12 to advance the exposed film unit from within the film cassette 34 into the bite of the rollers 60 and 62 whereby the exposed film unit is processed and advanced through the film withdrawal slot 31 to the exterior of camera 10.

In FIG. 5, the indicia-bearing member 90 is shown as viewed from the second side with the exposure counter stationed in the starting position. The ratchet wheel 96 is shown having the first set of drive teeth 142 spaced around an outer periphery of the ratchet wheel 96 for cooperating with the drive pin 84 included upon the timing gear 82 for rotating or indexing the indicia-bearing member 90. A first end tooth 170 is substantially longer or greater in height, as measured radially from a root diameter for the first set of drive teeth 142, than any of the remaining members of the set of drive teeth 142 included upon the ratchet wheel 96. The first end tooth 170 is the first tooth engaged by the drive pin 84 during the indexing sequence. During the automatic dark slide cover 38 removal, the timing gear 82 is set into motion by the motor 70 upon the pivotal movement of the loading access door 30 into the closed position. The drive pin 84 moves into engagement with surface 172 of the end tooth 170 and drives against the surface 172 thereby imparting motion to the indicia-bearing member 90 to rotate the indicia-bearing member 90 through a predetermined angular displacement.

The length of the first end tooth 170 enables the drive pin 84 to remain in contact with the surface 172 for a greater period of time before the contact therebetween is broken and the drive pin 84 is disengaged from the end tooth 170 thereby assuring that the indicia-bearing member 90 is rotated through the predetermined angular displacement which is substantially greater than the predetermined arc previously described as resulting from the contact made between the drive pin 84 and any of the remaining teeth of the first set of drive teeth 142. The resulting predetermined angular displacement of the indicia-bearing member 90 substantially assures that the indicia-bearing member 90 is moved out of its starting position whereby the face groove cam 140 (as viewed in FIG. 6) included upon a first side of the indicia-bearing member communicates motion to the slider member 118 as shall be described in detail hereinafter.

Following this pre-exposure dark slide removal operation, the user by depressing the exposure actuator button 44 initiates an exposure cycle for the camera 10 during which the motor 70 is energized to drive the timing gear 82 through the one revolution per exposure cycle. During the cycle, the drive pin 84 engages a successive one of the remaining teeth of the first set of drive teeth 142 to sequentially index the indicia-bearing member 90 through the predetermined arc and thereby register a new character at the window of the viewing station 52.

This cycle of events is repeated for each actuation of the exposure actuator button 44 until the indicia-bearing member 90 has been indexed or rotated to a position whereat a character designating that the film cassette 34 is empty, is aligned with the window of the viewing station 52.

When the responsive means 94 is pivotally moved into the first position in response to the removal of the film cassette 34 from the camera 10, the spring means 92 operates to drive the indicia-bearing member 90 in a clockwise direction (as viewed in FIGS. 2 and 6) whereupon the exposure counter 88 is returned from the terminal position back to the starting position. It will be noted that the film cassette 34 may be removed at anytime from within the receiving chamber 32 and the operation of the exposure counter 88 would not be affected. That is to say, should the user decide to remove a partially used film cassette 34, the exposure counter 88 would be driven under the bias of the spring means 92 back into the starting position.

Figure 7C:
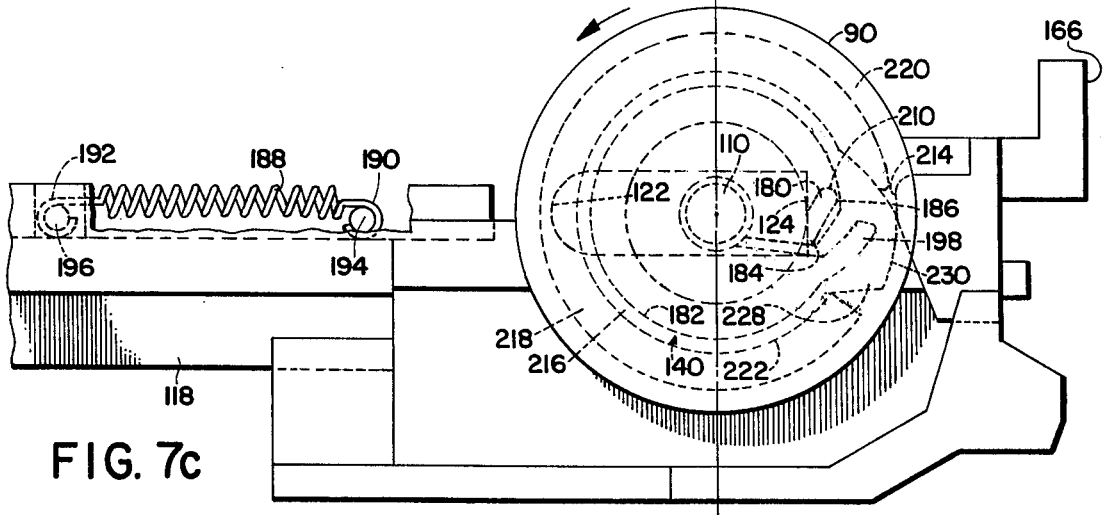

The face groove cam 140 included on the first side of the indicia-bearing member 90 is best shown in FIG. 6 and in FIGS. 7a, 7b and 7c wherein the first set of drive teeth 142 and the second set of latching teeth 144 have been removed from the second side of the indicia-bearing member 90 for clarity. The cam 140 is shown in FIGS. 6 and 7a with the exposure counter 88 located in the starting position as viewed from the first and second sides, respectively, of the indicia-bearing member 90. In FIG. 7b the cam 140 is shown with the exposure counter 88 located in the indexing or counting position and in FIG. 7c the cam 140 is shown with the exposure counter 88 located in the terminal or end position as viewed from the second side of the indicia-bearing member 90.

The face groove cam 140 provided within the surface of the first side of the indicia-bearing member 90 includes a curved finger portion 198 which is an extension of a first groove 200 and a cam follower engagement surface 182. The curved finger portion 198 includes a terminal edge 202 having an end thereof integrally joined to one of a pair of spaced substantially parallel first and second edges 204 and 208, respectively. The first edge 204 diverges inwardly and downwardly, as viewed in FIG. 6, from one end of the terminal edge 202 to integrally join the follower engagement surface 182 at point 206. The second edge 208 diverges inwardly from an opposing end of the terminal edge 202 generally parallel with the first edge 204 to complete the curved finger portion of the face groove cam 140 and extends inwardly parallel with the continuing edge of the follower engagement surface 182 in the direction of the central bore 126 of the indicia-bearing member 90 to integrally join the peripheral edges of a hub 203 thereby providing a secondary stop member 205 for the exposure counter 88.

The slider member 118 includes a cam follower 180 mounted adjacent to the vertical end 124 of slot 116 which slidably engages and follows the contours of the cam follower engagement surface 182 of the cam 140. The cam follower 180 includes a surface 184 having a forwardmost edge 186 which is held in engagement with the follower engagement surface 182 of the cam 140 by a force, in the direction of the front cover 24, applied to the slider member 118 by a biasing spring 188.

As best shown in FIG. 3 of the drawings, the biasing spring 188 includes a leading end 190 and a trailing end 192. The leading end 190 is attached to a pin 194 included upon the inwardly facing surface 120 of the first side mounting member 98 and the trailing end 192 is attached to a pin 196 included upon the slider member 118 whereby the slider member 118 is forwardly biased by the spring 188 and the cam follower surface 184 is firmly retained against the follower engagement surface 182 of the cam 140.

FIG. 7a of the drawings shows the cam 140 on the indicia-bearing member 90 as viewed from the second side of the indicia-bearing member 90 with the cam follower 180 engaged with the cam 140 in the curved finger portion 198 and the exposure counter 88 in the starting position. The slider member 118 is held in the forwardmost position by the engagement between the curved finger portion 198 and the cam follower 180. The curved finger portion 198 is displaced a distance relative to the central bore 126 of the indicia-bearing member 90 substantially greater than the constant radius of the first groove 200 and the follower engagement surface 182 of the cam 140. The slider member 118 remains in this forwardmost position until the forwardmost edge 186 of the cam follower surface 184 is moved into contact with the follower engagement surface 182 which takes place in response to the indexing or rotation of the indicia-bearing member 90 in a counterclockwise direction for movement of the exposure counter 88 out of the starting position into the second intermediate position as shown in FIG. 7b.

The follower engagement surface 182 defines a constant radius surface for the forwardmost edge 186 of the cam follower 180. Subsequent to the counterclockwise indexing or rotation of the indicia-bearing member 90 during the pre-exposure cycle, the cam follower 180 is cammed out of the curved finger portion 198 by the first edge 204. The constant radius of the follower engagement surface 182 is substantially less than the radius of the first edge 204 of curved finger portion 198 with respect to the center bore 126 of the indicia-bearing member 90. Therefore, the follower engagement surface 182 operates against the biasing spring 188 to force the slider member 118 to slidably move inwardly into the housing section 12 out of the forwardmost position (as viewed in FIG. 7a) into a second most forward or the second-intermediate position as viewed in FIGS. 7b and 7c.

The forwardmost edge 186 of the cam follower 180 remains in substantial engagement with the follower engagement surface 182 when the slider member 118 is in the second intermediate position and thereby limits the slider member 118 upon its return under the bias of the spring 188 from the third rear to the second most forward or intermediate position subsequent to each depression and release of the exposure actuator button 44. The indicia-bearing member 90 is sequentially indexed counterclockwise subsequent to each exposure until it arrives at the position shown in FIG. 7c wherein the exposure counter 88 is shown in the terminal position. The forwardmost edge 186 of the cam follower 180 remains in engagement with the follower engagement surface 182 thereby positioning the slider member 118 in the second-intermediate position, when the exposure counter 88 is in the terminal position. Therefore, the face groove cam 140 provides a means for contact with the exposure initiating means whereby the slider member 118, through the sliding engagement between the cam follower 180 and the cam 140, in response to the angular disposition of the indicia-bearing member 90 must assume a definite series of positions, i.e., the forwardmost and intermediate positions as the indicia-bearing member 90 is indexed into a corresponding series of positions.

Removal of the empty film cassette 34 permits the responsive means 94 to pivotally move from the second position to the first position whereby the spring means 92 releases the energy stored therein and drives the indicia-bearing member 90 from the position shown in FIG. 7c in a clockwise direction to the position shown in FIG. 7a, thereby moving the exposure counter 88 from the terminal position to the starting position. During the return of the exposure counter 88 to the starting position, the cam follower 180 slidably moves against the follower engagement surface 182 of the cam 140. The unwinding spring means 92 rotates the indicia-bearing member 90 and enables the cam follower 180 to slidably move beyond the point 206 into the curved finger portion 198 thereby enabling the biasing spring 188 to urge the slider member 118 to slidably move upon shaft 110 and to return it to the first forwardmost position (see FIG. 7a). The terminal edge 202 of the curved finger portion 198 acts as a means for halting the exposure counter 88 at the starting position upon its return from the terminal position by interrupting the travel of the indicia-bearing member 90 at a precise location established by the contact between the terminal edge 202 and the unattached end 210 of the cam follower 180 as the follower 180 is moved into the curved finger portion 198 of the cam 140.

The movement of the slider member 118 into the forwardmost position enables a pair of electrical switches to close whereby the camera's electronic control system is prepared for operation in the pre-exposure mode for automatic advancement of the dark slide cover 38 to the exterior of the camera. However, notwithstanding the closing of the switches upon the movement of the slider member 118 to the first forwardmost position, the electronic control system is rendered inoperative at that time as the battery for the operation thereof has been disposed of upon the removal of the empty film cassette. When the loading access door 30 is opened to install a fresh film cassette 34 having a fresh battery within the receiving chamber 32, one of the electrical switches coupled thereto is opened thereby breaking the connection between the newly installed battery and the electronic control system until the fresh film cassette 34 is secured within the camera 10 by the pivotal movement of the loading access door 30 into the closed operative position.

It will be noted that the cam follower 180 is captured within the curved finger portion 198 when the exposure counter 88 is in the starting position. Second edge 208 substantially prevents the slider member 118 from moving out of the first forwardmost position should the user attempt to depress the exposure actuator button 44 while the responsive means 94 is in the first position, wherein the responsive means 94 is disengaged from the ratchet wheel 96 of the indicia-bearing member 90. If the second edge 208 was not provided therefor, the spring means 92 would be free to further unwind and drive the exposure counter 88 beyond the starting position whereby the exposure counter would be out of position for the pre-exposure cycle operation.

To assure the exposure counter 88 is prevented from moving out of the starting position prior to the indexing of the indicia-bearing member 90 during the pre-exposure dark slide removal cycle, the secondary stop member 205 is included upon the first side of the indicia-bearing member 90 as a back up to the second edge 208 as a means for preventing the spring means 92 from driving the exposure counter 88 beyond the starting position when the responsive means 94 is in the first position. It may be remotely possible, under a given set of adverse conditions, for the first edge 204 to act against the cam follower and cam the cam follower 180 out of the curved finger portion 198 when the user depresses the exposure actuator button 44 whereby the slider member 118 would move rearwardly into the vertical upper section 26 to be engaged and thereby stopped against a leading edge 230 of a slider inhibiting surface 228 of the cam 140 stationed within the path of travel of the slider member 118. However, in response thereto, the indicia-bearing member 90 may be slightly rotated counter-clockwise (as viewed in FIG. 7a) and possibly moved a distance whereby the leading edge 230 would be out of the path of travel of the slider member 118 whereupon the indicia-bearing member 90 would, upon the release of the exposure actuator button 44, reverse its direction of rotation under the bias of the unwinding spring means 92 and drive the exposure counter 88 beyond the starting position. The secondary stop member 205 prevents the exposure counter 88 from moving beyond the starting position by interrupting the travel of the indicia-bearing member 90 in the reverse direction by striking against the cam follower 180 thereby halting the indicia-bearing member 90 and enabling the cam follower 180 to return within the curved finger portion upon the release of the exposure actuator button 44.

The indicia-bearing member 90 is indexed by the timing gear 82 to the position shown in FIG. 7b during the pre-exposure dark slide removal cycle wherein the cam follower 180 is no longer within the curved finger portion 198 of the cam 140 and the forwardmost corner edge 186 of the cam follower 180 is in contact with the follower engagement surface 182 of the cam 140. As previously recited, the relative greater length of the first end tooth 170 of the first set of drive teeth 142, included upon the second side of the indicia-bearing member 90, enables the drive pin 84 to remain in contact with the surface 172 for a relatively greater period of time before the contact therebetween is broken thereby assuring the indicia-bearing member 90 is indexed or rotated through the predetermined angular displacement necessary to remove the cam follower 180 from within the curved finger portion 198 of the cam 140.

During the dark slide cover removal cycle the slide member 118 is slidably moved rearwardly into the second intermediate position wherein the components of the switching arrangement previously closed by its movement into the forwardmost position are opened. Upon arriving in the intermediate position, the exposure initiating means, i.e., the slider member 118 having the exposure actuator button 44 mounted thereon, is in position to be manually depressed into a third position to actuate the camera's electronic control system for each photographic exposure cycle of the camera 10.

To initiate the photographic exposure cycle of the camera, the user depresses the exposure actuator button 44 whereupon the slider member 118 is slidably moved longitudinally within the housing section 12 in the direction of the inclined rear wall 18 of the camera 10 into the third or rear position (not shown) against the force of the forwardly biasing spring 188.

The slider member 118 includes a shoulder 212 extending from one side thereof for contact with a stop pin 213 included upon the inwardly facing surface 120 of the first mounting member 98 when the slider member is moved from the second position into the third position. When the exposure actuator button 44 is depressed, the slider member 118 is prevented from penetrating beyond the third or rear position by the engagement between the shoulder 212 and the pin 213. The contact between the shoulder 212 and the stop pin 213 signals the user that the slider member 118 has arrived at the third position and the exposure actuator button 44 is to be released to permit the spring 188 to return the slider member 118 to the intermediate position. When the user removes his finger from the exposure actuator button 44, the spring 188 operates to slidably move the slider member 118 along a similar path forwardly in the direction of the vertical upper section 26 of the camera 10 until halted in the second position by the engagement between the forwardmost edge 184 of the cam follower 180 and the cam follower engagement surface 182 of the cam 140.

An alternative method of providing a stop for the slider member 118 at the third position is incorporated into the configuration of the surfaces inclined upon the first side of the indicia-bearing member which are best shown in FIG. 8 wherein the first side of the indicia-bearing member 90 is shown as further including a disc portion 215, a first groove 200, a dividing wall 216, a second groove 218 and an outer wall 220. The dividing wall 216 is located between the first and second grooves 200 and 218, respectively, and is defined by the difference in radii, relative to the central bore 126 of the indicia-bearing member 90, between the edges of the follower engagement surface 182 and a slider stop surface 222 (as viewed in FIGS. 6, 7a, 7b, 7c and 8). The outer wall 220 is defined by the difference in radii relative to the central bore 126 between a first edge 224 and a second edge 226 which defines the outer periphery of the indicia-bearing member 90. It will be noted that the height of the dividing wall 216 is substantially greater than that of the disc portion 215 and the outer wall 220 thereby enabling the cam follower 180 and a lobe 214 included upon the slider member 118 to pass above the disc portion 215 and the outer wall 220, respectively, when the exposure actuator button 44 is depressed and the slider member is moved thereby from the second to the third position for intiating exposure of one of the film units 36. Therefore, when the user depresses the exposure actuator button 44 and the slider member 118 is moved thereby longitudinally within the housing section 12, the lobe 214 strikes against the slider stop surface 222 whereby the penetration of the slider member 118 into the housing 12 is halted at the third position and the photographic exposure cycle is started.

The cycle of events is repeated for each depression of the button 44 whereupon the forwardmost film unit is exposed, processed and advanced to the exterior of the camera 10. In the course of each cycle, the timing gear 82 is rotated through the full revolution to index the indicia-bearing member 90, as previously described, and the exposure counter 88 is moved toward the terminal position. The indicia-bearing member 90 is moved into the position shown in FIG. 7c subsequent to the exposure and during the advancement of the last film unit 36 toward the exterior of the camera 10.

The cam 140 further includes the slider inhibiting surface 228 having the leading edge 230 for engaging the lobe 214 of the slider member 118 when the exposure counter 88 is moved into the terminal or end position (as viewed in FIG. 7c). When the indicia-bearing member 90 is indexed into the position shown in FIG. 7c, the slider inhibiting surface 228, in response to the movement of the exposure counter 88 into the terminal position, is rotated into a position wherein the leading edge 230 engages the lobe 214 and operates to force the slider member 118 out of the third position into the intermediate position. This movement is relayed to the user through the movement of the exposure actuator button 44 and signals the user that a final exposure has been made and that the film cassette 34 is empty. The slider inhibiting surface 228 and the lobe 214 remain engaged until counter 88 is rotated out of the terminal position and returned to the starting position by the removal of the empty film cassette from within the film receiving chamber 32. Therefore, the slider inhibiting surface 228 provides a means for contact with the exposure actuating means whereby the exposure actuating means is latched in the intermediate position and inhibited from further actuation. Should the user attempt to depress the exposure actuator button 44, the slider member 118 will remain in its present intermediate position due to the mechanical interlock between the leading edge 230 of the slider inhibiting surface 228 and the lobe 214. It is this interlock which provides the camera 10 with an inexpensive mechanical exposure and flash inhibitor which prevents the wasteful firing of a flash when the user has failed to remove a flash attachment from the mounting receptacle 50 included upon the top wall section 16 of the camera 10 and the supply of film has been exhausted.

Figure 9:
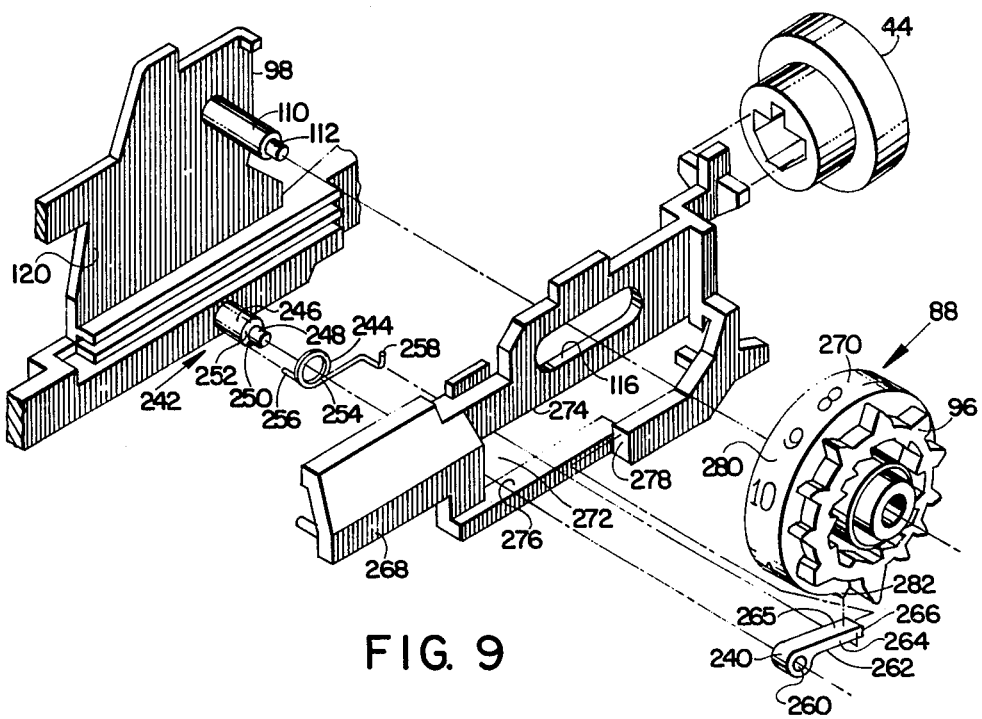
FIG. 9 is a perspective view, shown in exploded fashion of an alternative embodiment of an exposure counter adapted for use with the photographic apparatus of FIG. 1.
Figure 10:
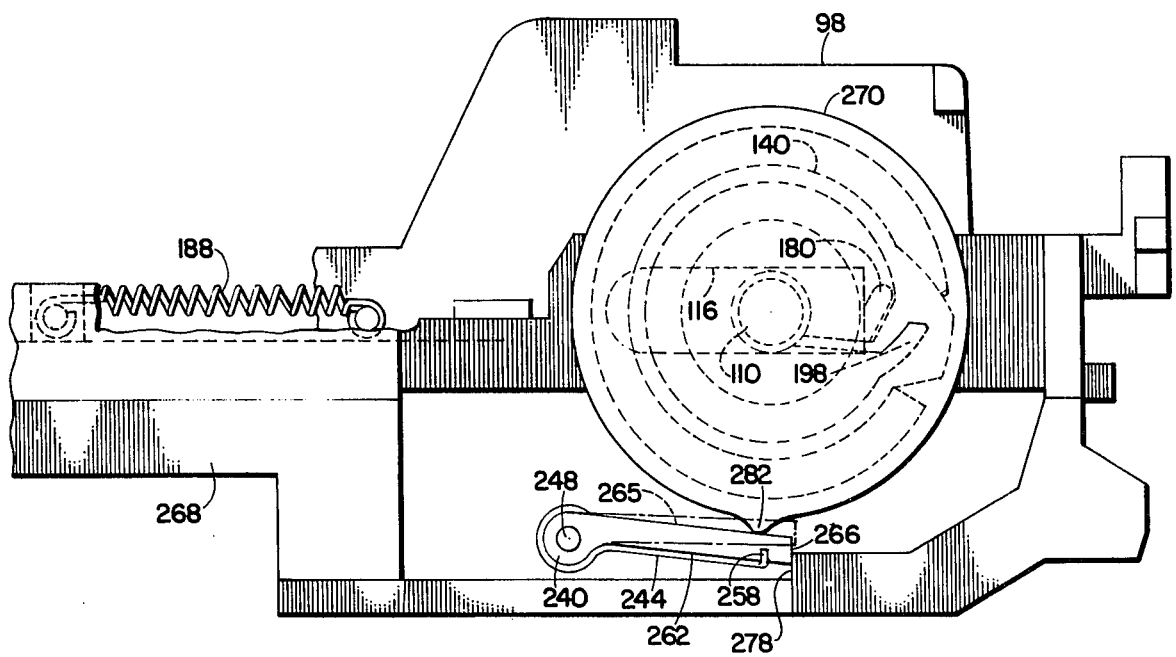
FIG. 10 is a diagrammatic illustration of the exposure counter of FIG. 9 in an operative position which is a counterpart to that shown in FIG. 7c.

An alternative embodiment of the exposure counter 88 is shown in FIGS. 9 and 10. The exposure counter 88 includes an alternative means for contact with the exposure actuating means thereby providing the camera 10 with an inexpensive mechanical exposure and flash inhibitor when the exposure counter 88 has arrived at the terminal position.

The exposure counter 88 is disposed between the first and second mounting members 98 and 100, respectively, and operates in substantially the same manner previously disclosed during its movement from the starting position to the terminal position. However, when the exposure counter 88 arrives at the terminal position, the mechanical interlock which provides the camera with the exposure and flash inhibitor results from an engagement between a means for contact with the exposure actuating means mounted upon the inwardly facing surface 120 of the first side mounting member 98 and a surface included upon the slider member 118 which cooperates to latch the exposure actuating means in the intermediate position and thereby inhibit further actuation of the exposure actuating means.

In the alternative embodiment, the means for contact with the exposure actuating means comprises a pawl 240, a shaft 242 and a torsional member 244. The pawl 240 is mounted upon the shaft 242 for pivotal movement between a first raised position and a second lowered position. The shaft 242 is included upon the inwardly facing surface 120 of the first member 98 and extends inwardly therefrom having a pair of coaxial, longitudinally spaced first and second cylindrical surfaces 246 and 248, respectively. The first cylindrical surface 246 has a larger diameter than the second cylindrical surface 248 and is integrally joined thereto to provide a shoulder 252 lying in a plane substantially perpendicular to the axes of the cylindrical surfaces at the juncture of the two cylindrical surfaces 246 and 248. A groove 250 extends longitudinally within the first cylindrical surface 246 between the shoulder 252 and the inwardly facing surface 120.

The torsional member 244 includes a coil 254 integrally joined to a first end 256 and a second end 258. The coil 254 includes an opening for receiving the first cylindrical surface 246 of the shaft 242 therein whereby the torsional member 244 is mounted thereon having the first end 256 thereof inserted into the groove 250 of the first cylindrical surface 246 for securing the torsional member 244 to the shaft 242.

The pawl 240 includes a bore 260, an underlying surface 262, an inwardly facing side 264, a contact surface 265 and an engagement end 266. The bore 260 is provided to receive the second cylindrical surface 248 of the shaft 242 therein for pivotally mounting the pawl 240 thereon against the shoulder 252. The second end 258 of the torsional member 244 is configured to bear against the underlying surface 262 and the surface of the inwardly facing side 264 of the pawl 240. Once the first end 256 of the torsional member 244 has been secured within the slot 250 to the shaft 242, the second end 258 thereof must be deflected to secure it to the surfaces 262 and 264 of the pawl whereby a stress is developed in the torsional member 240 which acts to urge the pawl 240 upwardly and against the shoulder 252 of the shaft 242 for retaining the pawl 240 in a predetermined location thereon.

The inwardly facing surface 120 of the first side mounting member 98 includes the inwardly extending second shaft 110 for mounting a slider member 268 and an indicia-bearing member 270 thereon. The slider member 268 includes the slot 116, a pawl engaging surface 278 and a large opening 272, defined vertically by upper and lower edges 274 and 276, respectively, which extends longitudinally in the slider member 268 below the slot 116. The slot 116 enables the second shaft 110 to extend through the slot 116 for mounting the slider member 268 thereon whereby the slider member 268 is slidably moved longitudinally within the housing section 12 as has been previously described during its movement between the series of positions. The indicia-bearing member 270 is mounted upon the cylindrical surface of the second shaft 110 extending through the slot 116. The large opening 272 enables the second cylindrical surface 248 of the shaft 242 to extend therethrough for mounting the pawl 240 therein. The indicia-bearing member includes the ratchet wheel 96, which is indexed by the pin 84 on the timing gear 82, and a rotary dial 280 supporting sequentially arranged identifying characters around a face thereof for visually indicating through the window of the viewing station 52 the number of film units 36 included within the film receiving chamber 32. The rotary dial 280 includes a cam surface 282 positioned upon the face of the rotary dial at a predetermined location whereat the cam surface 282 is moved into substantial full contact with the contact surface 265 of the pawl 240 substantially near the engagement end 266 when the exposure counter 88 is moved into the terminal position whereby a character designating the last film unit 36 has been exposed and is aligned in the window of the viewing station 52.

Shafts 110 and 242 are vertically spaced upon the inwardly facing surface 120 of the first side mounting member 98 such that the pawl 240 and the rotary dial 280 when mounted upon their appropriate shaft are in alignment in a plane substantially perpendicular to the axes of the shafts 110 and 242 with the contact surface 265 of the pawl 240 stationed below and in contact with the face of the rotary dial 280 throughout the indexing of the indicia-bearing member 270. The torsional member 244 acts to bias the pawl 240 upwardly in the direction of the indicia-bearing member 270, and against the shoulder 252 of the shaft 242, thereby maintaining this alignment and to urge the contact surface 265 to bear against the face of the rotary dial 280.

The pawl 240 pivotally moves into the first raised position wherein the engagement end 266 thereof is elevated above the pawl engaging surface 278 of the slider member 268 to enable the slider member 268 to move longitudinally within the housing section 12 without interruption when the exposure counter 88 is indexed out of the starting position and the exposure actuator button 44 is depressed to initiate the photographic cycle for exposing, processing and advancing each of the predetermined number of film units 36 to the exterior of the camera 10.

Subsequent to the exposure, and during the advancement of the last remaining film unit 36 to the exterior of the camera, the exposure counter 88 is moved to the terminal position. The indicia-bearing member 270 is indexed by the timing gear 82 counterclockwise (as viewed in FIG. 10) during the movement of the exposure counter 88 into the terminal position and the slider member 268 is returned to the intermediate position by the biasing spring 188. The cam 282 included upon the face of the rotary dial 280, in response to the movement of the indicia-bearing member 270, is moved into engagement with the contact surface 265 of the pawl 240 whereby the pawl 240 is pivotally moved by the cam 282 into the second lowered position and the engagement end 266 thereof into the path of travel of the pawl engaging surface 278 of the slider member 268 to provide a mechanical interlock therebetween. It is this interlock produced by the lowering of the engagement end 266 of the pawl 240 into the path of travel of the slider member 268 which provides the camera 10 with an inexpensive mechanical exposure and flash inhibitor.

When the empty film cassette is removed from within the film receiving chamber 32 of the camera 10, the exposure counter 88 is returned to the starting position by unwinding spring means 92 whereby the indicia-bearing member 270 is driven in a clockwise direction (as viewed in FIG. 10). The cam 282 is moved out of contact with the contact surface 265 and enables the pawl 240 to pivotally move upwardly into engagement with the face of the rotary dial 280 under the urging of the torsional member 244 into the first raised position and the slider member 268 is freed thereby to move longitudinally within the housing 12.

Figure 11:
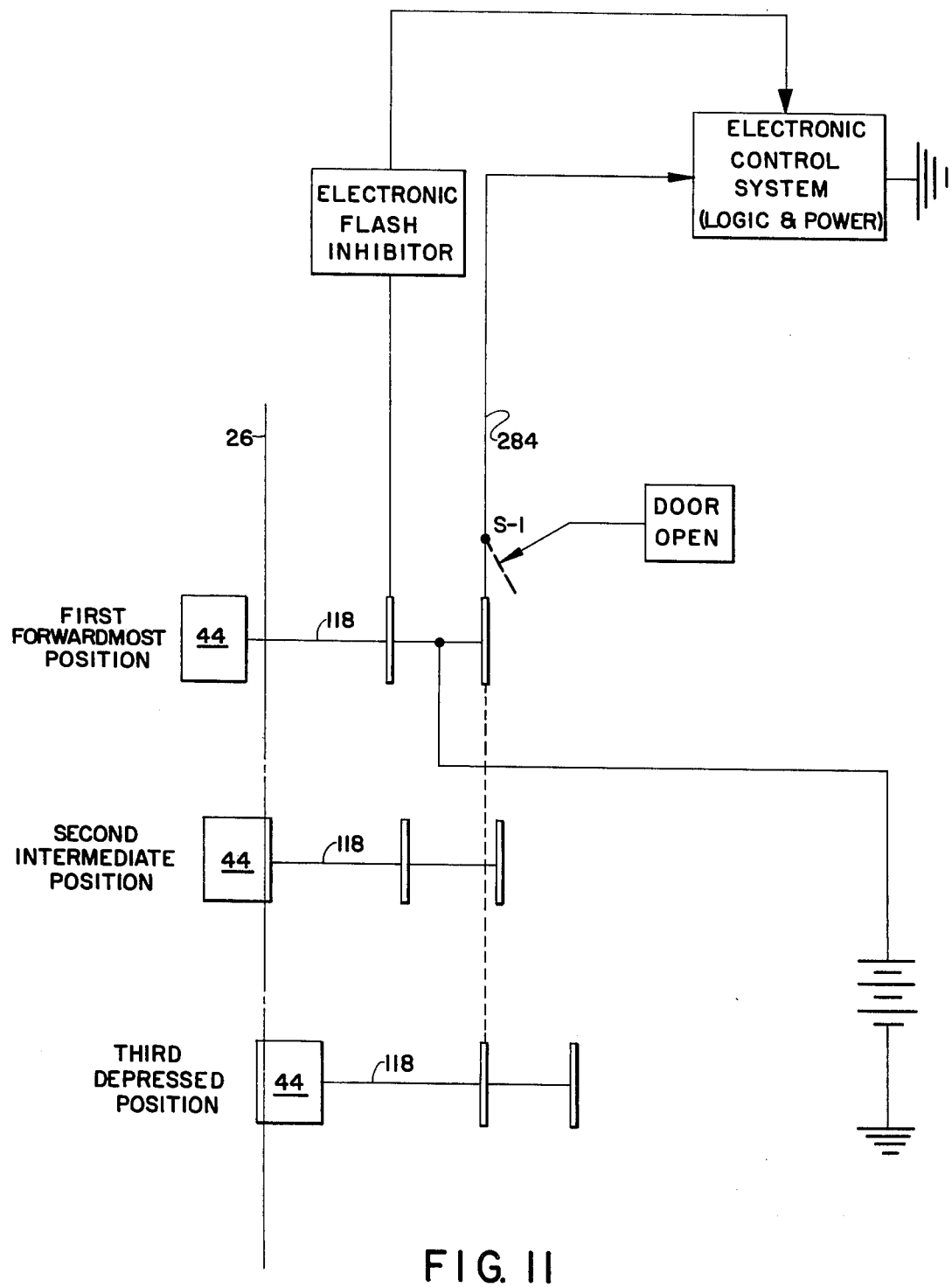
FIG. 11 is a schematic diagram of the operating positions of a means for initiating exposure included within the photographic apparatus of FIG. 1.

The operational phase of the present invention is shown schematically in FIG. 11. An electrical switch, S-1, is attached to a power line 284 for connecting the electronic control system to the power source for operaion thereof when the switch is closed. S-1 switch is mounted within the camera 10 such that the switch is responsive to the movement of the loading access door 30 whenever the door 30 is pivotally moved between the open inoperative position and the closed operative position whereby the switch is open and closed respectively. That is to say, the slider member 228 may be in any one of its three positions and not disrupt the interaction between the loading access door 30 and the S-1 switch.

The means for initiating exposure of the predetermined number of film units 36 is shown schematically in the first, second and third positions comprising the exposure actuator button and the slider member 118. When the loading access door 30 is opened to remove the film cassette 34 from within the film receiving chamber 32, S-1 is held open thereby disconnecting the power source from the electronic control system. The removal of the film cassette operates to return the exposure counter 88 to the starting position whereby the means for initiating exposure is moved by the rotation of the indicia-bearing member 90 and 268 of the first and second embodiments, respectively, from the second intermediate position to the first forwardmost position whereupon an electronic flash inhibitor is activated to prevent the firing and wasteful expenditure of a flash unit when the electronic control system is connected to the power source. In addition, the means for initiating exposure is in position for contact with the S-1 switch upon its release from the open position by the movement of the loading access door 30 to the closed operative position. The means for initiating exposure remains in the first forwardmost position until a film cassette 34 including a power source is received within the film receiving chamber 32 and is secured therein by closing and latching the loading access door 30 whereby the S-1 switch is closed connecting the power source to the electronic control system for removing the forwardmost member of the assemblage from within the film cassette 34 and advancing it to the exterior of the camera 10.

The electronic control system includes a latching network which operates to complete the preexposure and exposure cycles once the appropriate switches have been closed whether or not such switches remain closed throughout each of the cycles.

During the advancement of the forwardmost member to the exterior of the camera 10, the exposure counter 88 is indexed out of the starting position and the means for initiating exposure moved thereby to the second or intermediate position whereby the electronic flash inhibitor and the power line are disconnected from the electronic control system rendering the camera 10 inoperative.

The user must depress the exposure actuator button 44 to initiate the photographic cycle for the camera for exposing, processing and advancing each of the predetermined number of film units 36 one by one to the exterior of the camera 10. Each depression of the exposure actuator button 44 moves the means for initiating exposure from the second intermediate position to the depressed or third position as illustrated in FIG. 11 whereby the exposure actuator button 44 penetrates into the vertical upper section 26. The slider member 118 is moved thereby to complete the connection between the power source and the electronic control system thereby energizing the electrical control system for each photographic cycle. The means for initiating exposure is returned to the intermediate position, and the power line 284 is opened, by the biasing spring 188 operating to urge the means for initiating exposure out of the third or depressed position and to return it to the intermediate position subsequent to each actuation.

Although the power source necessary to operate the present invention has been described as preferably included within the film cassette, it should be obvious to one skilled in the art that such a source could be coupled to the camera at a location which is readily accessible to the user whereby the user may readily disconnect such a source, e.g., by a power-off switch, to render the camera inoperative should the user remove an empty film cassette from within the film receiving chamber and close the loading access door without replacing the removed cassette with another.

From the foregoing, it can be seen that there has been disclosed a new and unobvious arrangement of a relatively few parts which comprise an exposure counter for conveying to the user the number of exposures which have been made or the number of available exposures remaining upon each actuation of an exposure actuator.

The exposure counter includes an indicia-bearing member which is sequentially rotated or indexed from a starting position, wherein a freshly inserted film laden cassette is received within the camera and the dark slide cover is automatically removed and advanced to the exterior of the camera, to a terminal position wherein all of the film units previously stored within the film cassette have been exposed, processed and advanced to the exterior of the camera and the exposure actuator means is inhibited from further actuation as a result of the movement of the exposure counter into the terminal position. The rotation of the indicia-bearing member is employed to communicate motion to the exposure actuator whereby the actuator must assume a definite series of positions during which the indicia-bearing member occupies a corresponding series of positions. Therefore, the exposure actuator means is responsively moved according to the angular disposition of the indicia-bearing member of the exposure counter.

Although a specific type of camera has been described herein, it should be understood the present invention could be incorporated into a camera of the non self-developing type wherein the pre-exposure cycle could be used to drive the first frame of a roll of film into position for exposure rather than ejecting a dark slide.

The invention may be practiced or embodied in still other ways without departing from the spirit and essential character thereof. The preferred embodiment described herein is therefore to be considered illustrative and not restrictive, the scope of the invention being indicated by the appended claims and all variations which come within the meaning of the claims are intended to be embraced therein.

What is claimed is:

1. Photographic apparatus comprising:
   a housing including means defining a chamber for receiving a film cassette of the type including a plurality of film units;
   a door coupled to said housing adjacent said chamber for movement between an open position wherein the cassette may be inserted into or removed from said chamber and a closed position wherein the cassette is secured within said chamber;
   means for exposing each of the film units;
   means cooperable with said exposure means for initiating an exposure cycle, said exposure initiating means being mounted for movement between a first position wherein it cannot be actuated to initiate an exposure cycle, to a second position wherein it may be actuated to initiate an exposure cycle, and a third position wherein an exposure cycle is initiated; and
   means coupled to said exposure initiating means for automatically moving said exposure initiating means from said first position to said second position responsive to the insertion of a cassette into said chamber and subsequently moving said door into said closed position.

2. Photographic apparatus as defined in claim 1 wherein said means coupled to said exposure initiating means is constructed to prevent movement of said exposure initiating means from said second position to said third position after a predetermined number of film units have been exposed.

3. Photographic apparatus as defined in claim 2 wherein said means coupled to said exposure initiating means includes an exposure counter.

4. Photographic apparatus as defined in claim 1 wherein said means coupled to said exposure initiating means is constructed to facilitate movement of said exposure initiating means from said second position to said first position in response to withdrawal of the cassette from said chamber.

5. Photographic apparatus as defined in claim 4 wherein said means coupled to said exposure initiating means includes an exposure counter.

6. Photographic apparatus comprising:
a housing including means defining a chamber for receiving therein a film cassette including an assemblage having a predetermined number of photosensitive film units and an opaque member for preventing exposure of the film units prior to inserting the cassette into said chamber;
a viewing station included on said housing;
an exposure counter mounted for movement from a starting position, wherein the opaque member is automatically removed from the cassette in response to securing a new cassette in said chamber, to an intermediate position and then to a terminal position subsequent to an exposure of a final one of the predetermined number of film units, said exposure counter including an indicia-bearing member for presenting sequentially changeable identifying characters at said viewing station;
means for indexing said exposure counter from said starting position through said intermediate position to said terminal position whereby said indicia-bearing member is advanced for sequentially changing the identifying character present at said viewing station;
means for exposing each of the film units;
means for initiating the exposure of each of the predetermined number of film units, said exposure initiating means being mounted for movement between a first position wherein it cannot be actuated to initiate an exposure cycle and a second position wherein it may be actuated to initiate an exposure cycle; and said indicia-bearing member further includes means engageable with said exposure initiating means for moving said exposure initiating means from said first position to said second position as said exposure counter is moved from said starting position into said intermediate position, thereby rendering said exposure initiating means operable subsequent to the opaque member being removed from the cassette.

7. Photographic apparatus as defined in claim 6 wherein said engageable means is included upon a first side of said indicia-bearing member and said indicia-bearing member further includes upon a second side thereof a ratchet wheel having a first set of teeth spaced proximate an outer periphery thereof for engagement with said indexing means.

8. Photographic apparatus as defined in claim 7 wherein said indexing means includes a gear having means extending from one side thereof for engaging a particular tooth of said first set of teeth whereby said indicia-bearing member is rotated through a predetermined arc for sequentially changing the identifying character present at said viewing station.

9. Photographic apparatus as defined in claim 7 wherein said ratchet wheel further includes a second set of teeth coaxially arranged with said first set of teeth within said outer periphery of said ratchet wheel and spring means tensionable by operation of said indexing means for moving said exposure counter from said terminal position to said starting position upon removal of the cassette from within said chamber.

10. Photographic apparatus as defined in claim 9 further comprising responsive means mounted for movement between an inoperable position wherein said responsive means is disengaged from said second set of teeth to an operable position wherein said responsive means is in substantial full engagement with a particular one of said second set of teeth, said responsive means functioning in said inoperable position to automatically permit said exposure counter to return to said starting position upon the removal of the cassette from within said chamber under the bias of said spring means and in said operable position to prevent said spring means from operating to return said exposure counter to said starting position prior to the removal of the cassette from within said chamber.

11. Photographic apparatus as defined in claim 6 including means for biasing said exposure initiating means toward said first position.

12. Photographic apparatus as described in claim 11 wherein said engageable means includes a cam cooperating with said biasing means to slidably move said exposure initiating means into said first position when said exposure counter is moved out of said terminal position into said starting position.

13. Photographic apparatus as defined in claim 12 wherein said cam includes means for retaining said exposure initiating means in said first position prior to the advancement of said exposure counter out of said starting position.

14. Photographic apparatus as defined in claim 12 wherein said cam includes means for preventing advancement of said exposure counter beyond said starting position when said exposure counter is moved from said terminal position into said starting position.

15. Photographic apparatus comprising:
a housing including means defining a chamber for receiving therein a film cassette including an assemblage having a predetermined number of photosensitive film units and an opaque member for preventing exposure of the film units during loading of the cassette into said chamber;
a viewing station included on said housing;
an exposure counter mounted for movement from a starting position when the film cassette is secured within said chamber for automatically moving the opaque member out of protective relation with the film units to a terminal position subsequent to an exposure of a final one of the predetermined number of film units, said exposure counter including an indicia-bearing member for presenting sequentially changeable identifying characters at said viewing station;
means for indexing said exposure counter from said starting position to said terminal position whereby said indicia-bearing member is advanced for sequentially changing the identifying character present at said viewing station;

means for exposing each of the film units;

manually actuatable means for initiating the exposure of each of the predetermined number of film units, said manually actuatable means being mounted for movement between a first position, wherein the opaque member of the assemblage is advanced out of protective relation with the film units, to a second position wherein it is adapted to be manually actuated into a third position thereby initiating exposure of one of the predetermined number of film units; and said indicia-bearing member further includes means engageable with said manually actuatable means for moving said manually actuatable means from said first position into said second position, when said exposure counter is advanced out of said starting position by said indexing means, and out of said second position into said first position upon movement of said exposure counter out of said terminal position and into said starting position, and means for inhibiting actuation of said manually actuatable means movable into the path of movement of said manually actuatable means in response to movement of said exposure counter into said terminal position whereby said manually actuatable means is moved against the force of a user's finger from said third position into said second position to provide a mechanical interlock inhibiting further actuation of said manually actuatable means.

16. Photographic apparatus as defined in claim 15 further including a resilient biasing member for urging said manually actuatable means out of said third position into said second position.

17. Photographic apparatus as defined in claim 16 wherein said engageable means provides means for halting said manually actuatable means at said second position when said resilient biasing member operates to urge said exposure initiating means out of said third position into said second position.

* * * * *